(12) United States Patent
Wang et al.

(10) Patent No.: US 12,204,196 B2
(45) Date of Patent: Jan. 21, 2025

(54) DISPLAY PANEL AND METHOD FOR MANUFACTURING THE SAME, AND DISPLAY DEVICE

(71) Applicants: HEFEI BOE DISPLAY TECHNOLOGY CO., LTD., Anhui (CN); BOE TECHNOLOGY GROUP CO., LTD., Beijing (CN)

(72) Inventors: Xipeng Wang, Beijing (CN); Wei Zhang, Beijing (CN); Xin Zhou, Beijing (CN); Chao Li, Beijing (CN); Jilei Gao, Beijing (CN); Benzhi Xu, Beijing (CN); Yonggang Zhang, Beijing (CN); Bin Li, Beijing (CN); Qi Liu, Beijing (CN)

(73) Assignees: HEFEI BOE DISPLAY TECHNOLOGY CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 155 days.

(21) Appl. No.: 17/922,094

(22) PCT Filed: Oct. 26, 2021

(86) PCT No.: PCT/CN2021/126500
§ 371 (c)(1),
(2) Date: Oct. 28, 2022

(87) PCT Pub. No.: WO2022/217885
PCT Pub. Date: Oct. 20, 2022

(65) Prior Publication Data
US 2023/0168535 A1 Jun. 1, 2023

(30) Foreign Application Priority Data

Apr. 13, 2021 (CN) .......................... 202110397140.7

(51) Int. Cl.
*G02F 1/1335* (2006.01)
*G02F 1/1339* (2006.01)
(Continued)

(52) U.S. Cl.
CPC .. *G02F 1/133512* (2013.01); *G02F 1/133516* (2013.01); *G02F 1/1345* (2013.01);
(Continued)

(58) Field of Classification Search
None
See application file for complete search history.

(56) References Cited

U.S. PATENT DOCUMENTS

2008/0123004 A1  5/2008  Lin et al.
2013/0088672 A1  4/2013  Shin et al.
(Continued)

FOREIGN PATENT DOCUMENTS

CN    101430397 A    5/2009
CN    102681278 A    9/2012
(Continued)

OTHER PUBLICATIONS

Chinese Office Action (with English translation) for corresponding CN application No. 202110397140.7, dated May 22, 2023, 29 pages.
(Continued)

*Primary Examiner* — Shan Liu
(74) *Attorney, Agent, or Firm* — Dority & Manning, P.A.

(57) ABSTRACT

A display panel has a plurality of sub-pixel regions arranged in an array of a plurality of rows and a plurality of columns, and a light-shielding region that separates the sub-pixel regions and surrounds all the sub-pixel regions as a whole. The display panel includes: a first substrate; a light-shielding pattern layer located on the first substrate, the light-shielding pattern layer being located in the light-shielding region and
(Continued)

covering part of the light-shielding region; a second substrate disposed opposite to the first substrate; and a light-shielding structure layer located on the second substrate, the light-shielding structure layer covering at least a region of the light-shielding region that is not covered by the light-shielding pattern layer.

19 Claims, 10 Drawing Sheets

(51) Int. Cl.
    *G02F 1/1345* (2006.01)
    *G02F 1/1362* (2006.01)

(52) U.S. Cl.
    CPC ...... *G02F 1/1339* (2013.01); *G02F 1/136222* (2021.01); *G02F 1/136286* (2013.01); *G02F 2202/16* (2013.01)

(56) References Cited

U.S. PATENT DOCUMENTS

| | | | | |
|---|---|---|---|---|
| 2014/0028961 | A1* | 1/2014 | Yanagisawa | G02F 1/136286 349/106 |
| 2014/0184964 | A1 | 7/2014 | Byeon et al. | |
| 2015/0234492 | A1 | 8/2015 | Lu et al. | |
| 2016/0342016 | A1* | 11/2016 | Im | G02F 1/13394 |
| 2017/0102578 | A1 | 4/2017 | Shin et al. | |
| 2017/0235186 | A1* | 8/2017 | Dong | G02F 1/133512 349/106 |
| 2018/0120996 | A1 | 5/2018 | Kang et al. | |
| 2018/0188571 | A1 | 7/2018 | Wang | |
| 2018/0224704 | A1* | 8/2018 | Shao | G02F 1/134336 |
| 2019/0129238 | A1 | 5/2019 | Wang et al. | |
| 2019/0129262 | A1* | 5/2019 | Yu | G02F 1/136209 |
| 2020/0081291 | A1* | 3/2020 | Huang | G02F 1/133514 |
| 2020/0174309 | A1 | 6/2020 | Dong et al. | |
| 2022/0137451 | A1 | 5/2022 | Fang et al. | |

FOREIGN PATENT DOCUMENTS

| | | | | |
|---|---|---|---|---|
| CN | 103926739 | A | | 7/2014 |
| CN | 104503133 | A | | 4/2015 |
| CN | 104710844 | A | | 6/2015 |
| CN | 108319065 | A | | 7/2018 |
| CN | 108363233 | A | | 8/2018 |
| CN | 108427226 | A * | 8/2018 | ....... G02F 1/133512 |
| CN | 112230467 | A | | 1/2021 |
| JP | 2010044403 | A | | 2/2010 |
| JP | 2012185513 | A | | 9/2012 |
| KR | 20160032751 | A | | 3/2016 |

OTHER PUBLICATIONS

PCT International Search Report (w/ English translation) and Written Opinion for corresponding PCT Application No. PCT/CN2021/126500, dated Jan. 28, 2022, 13 pages.

* cited by examiner

DISPLAY PANEL AND METHOD FOR MANUFACTURING THE SAME, AND DISPLAY DEVICE

CROSS-REFERENCE TO RELATED APPLICATIONS

This application is a national phase entry under 35 USC 371 of International Patent Application No. PCT/CN2021/126500, filed on Oct. 26, 2021, which claims priority to Chinese Patent Application No. 202110397140.7, filed on Apr. 13, 2021, which are incorporated herein by reference in their entirety.

TECHNICAL FIELD

The present disclosure relates to the field of display technologies, and in particular, to a display panel and a method for manufacturing the same, and a display device.

BACKGROUND

Liquid crystal display (LCD) devices are widely used due to their low power consumption, small thickness, no radiation, soft image, and other advantages.

SUMMARY

In an aspect, a display panel is provided. The display panel has a plurality of sub-pixel regions arranged in an array of a plurality of rows and a plurality of columns, and a light-shielding region that separates the plurality of sub-pixel regions and surrounds all the sub-pixel regions as a whole. The display panel includes a first substrate, a light-shielding pattern layer, a second substrate, and a light-shielding structure layer. The light-shielding pattern layer is located on the first substrate, and the light-shielding pattern layer is located in the light-shielding region and covering part of the light-shielding region. The second substrate is disposed opposite to the first substrate. The light-shielding structure layer is located on the second substrate, and the light-shielding structure layer covers at least a region of the light-shielding region that is not covered by the light-shielding pattern layer.

In some embodiments, the light-shielding region includes a first light-shielding region separating the plurality of sub-pixel regions and a second light-shielding region surrounding all the sub-pixel regions. The first light-shielding region and the plurality of sub-pixel regions constitute a display region, and the second light-shielding region includes a first light-shielding sub-region located on a bonding side of the display panel. The light-shielding pattern layer includes a first light-shielding portion located in the first light-shielding sub-region. A first gap exists between the first light-shielding portion and the display region.

In some embodiments, in a direction perpendicular to an extension direction of a side of the display region proximate to the first light-shielding portion, a dimension of the first gap is greater than or equal to 5 μm.

In some embodiments, the light-shielding structure layer includes a first light-shielding structure. An orthographic projection of the first light-shielding structure on the first substrate covers the first gap.

In some embodiments, the first light-shielding structure includes at least two filter units of different colors that are stacked.

In some embodiments, the light-shielding region includes a first light-shielding region separating the plurality of sub-pixel regions and a second light-shielding region surrounding all the sub-pixel regions. The first light-shielding region and the plurality of sub-pixel regions constitute a display region, and the second light-shielding region includes a first light-shielding sub-region located on a bonding side of the display panel. The display panel further includes a first conductive layer, at least one insulating layer and a second conductive layer that are disposed on a side of the second substrate proximate to the first substrate in sequence. The first conductive layer includes a common voltage line located in the first light-shielding sub-region. The second conductive layer includes a plurality of common electrodes located in the plurality of sub-pixel regions and a conductive connection portion located in the first light-shielding sub-region and connecting to the plurality of common electrodes. The conductive connection portion is connected to the common voltage line through at least two via holes in the at least one insulating layer. A portion of the conductive connection portion located between two adjacent via holes has a hollowed-out portion.

In some embodiments, the hollowed-out portion is a recess-shaped opening, and an opening end of the recess-shaped opening faces away from the display region. The recess-shaped opening is set according to at least one of following manners: a width of the recess-shaped opening is approximately 32 μm; or a depth of the recess-shaped opening is approximately 13 μm; or a distance between a bottom surface of the recess-shaped opening and the display region is approximately 8 μm.

In some embodiments, the light-shielding region includes a first light-shielding region separating the plurality of sub-pixel regions and a second light-shielding region surrounding all the sub-pixel regions. The first light-shielding region and the plurality of sub-pixel regions constitute a display region, and the second light-shielding region includes a first light-shielding sub-region located on a bonding side of the display panel and a second light-shielding sub-region other than the first light-shielding sub-region. The light-shielding pattern layer includes a second light-shielding portion and a third light-shielding portion. The second light-shielding portion is located in the second light-shielding sub-region, and the second light-shielding portion extends from a boundary of the display region to a side away from the display region. The third light-shielding portion is located in the second light-shielding sub-region and located on a side of the second light-shielding portion away from the display region. The third light-shielding portion includes a plurality of light-shielding sub-blocks arranged at intervals, and at least part of the light-shielding sub-blocks are of different shapes.

In some embodiments, the light-shielding structure layer includes a second light-shielding structure. An orthographic projection of the second light-shielding structure on the first substrate covers at least a region located on a side of the second light-shielding portion away from the display region.

In some embodiments, the second light-shielding structure is located on a side of the second substrate away from the first substrate, and the second light-shielding structure includes black ink. Alternatively, the second light-shielding structure is located on a side of the second substrate proximate to the first substrate, and the second light-shielding structure includes at least two filter units of different colors that are stacked.

In some embodiments, the display panel further includes a frame sealant located between the second substrate and the first substrate. In a case where the second light-shielding structure is located on the side of the second substrate proximate to the first substrate, the frame sealant is located in the second light-shielding sub-region, and an orthographic projection of the frame sealant on the first substrate dose not overlap with the orthographic projection of the second light-shielding structure on the first substrate.

In some embodiments, the light-shielding region includes a first light-shielding region separating the plurality of sub-pixel regions. The light-shielding pattern layer includes a plurality of fourth light-shielding portions located in the first light-shielding region. A second gap exists between two adjacent fourth light-shielding portions.

In some embodiments, at least one fourth light-shielding portion in the plurality of fourth light-shielding portions is disposed between two adjacent rows of sub-pixel regions; a fourth light-shielding portion in the at least one fourth light-shielding portion extends in a row direction of the plurality of sub-pixel regions and extends across at least one sub-pixel region in the two adjacent rows of sub-pixel regions in the row direction.

In some embodiments, the at least one fourth light-shielding portion includes fourth light-shielding portions, a number of the fourth light-shielding portions between the two adjacent rows of sub-pixel regions is equal to a number of sub-pixel regions in a row of sub-pixel regions in the two adjacent rows of sub-pixel regions; each of the fourth light-shielding portions corresponds to a sub-pixel region in the row of sub-pixel regions, and each fourth light-shielding portion extends from a side to another side of the corresponding sub-pixel region.

In some embodiments, the light-shielding structure layer includes a plurality of third light-shielding structures. Each third light-shielding structure separates two adjacent columns of sub-pixel regions in the plurality of sub-pixel regions.

In some embodiments, the display panel further includes a color filter layer located on the second substrate. The color filter layer includes a plurality of filter units. Each filter unit covers a column of sub-pixel regions. Two adjacent filter units allow light of different colors to pass through, the two adjacent filter units partially overlap, and an overlapping portion of the two adjacent filter units is used as a third light-shielding structure in the plurality of third light-shielding structures.

In some embodiments, the third light-shielding structure includes at least two filter units of different colors that are stacked.

In some embodiments, the at least two filter units of different colors that are stacked include a blue filter unit and a red filter unit that are stacked.

In another aspect, a display device is provided. The display device includes the display panel as described in any one of the above embodiments.

In yet another aspect, a method for manufacturing a display panel is provided. The display panel has a plurality of sub-pixel regions arranged in an array of a plurality of rows and a plurality of columns, and a light-shielding region that separates the plurality of sub-pixel regions and surrounds all the sub-pixel regions as a whole. The manufacturing method includes: providing a first substrate and a second substrate; forming a light-shielding pattern layer on the first substrate, the light-shielding pattern layer being located in the light-shielding region and covering part of the light-shielding region; and forming a light-shielding structure layer on the second substrate, the light-shielding structure layer covering at least a region of the light-shielding region that is not covered by the light-shielding pattern layer.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

FIG. 6 is a diagram showing a relationship between voltage changes on a common voltage line, a black matrix pattern and a low-level signal line when a display panel in the related art is turned on;

DETAILED DESCRIPTION

Figure 1:
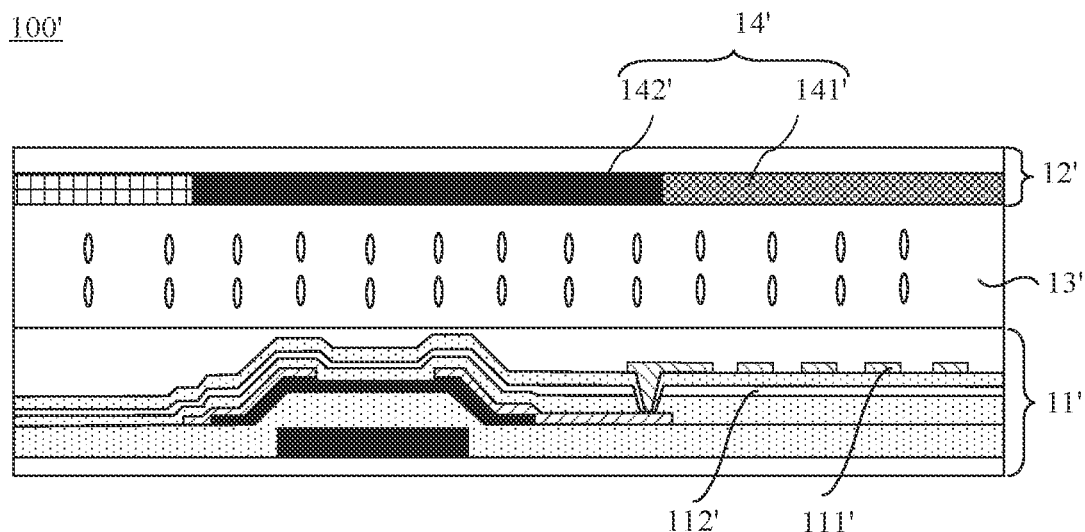
FIG. 1 is a structural diagram of a display panel in the related art.

Technical solutions in some embodiments of the present disclosure will be described clearly and completely below with reference to the accompanying drawings. Obviously, the described embodiments are merely some but not all of embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive meaning, i.e., "including, but not limited to". In the description, the terms "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or examples(s). In addition, specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, a feature defined with the term "first" or "second" may explicitly or implicitly include one or more features. In the description of the embodiments of the present disclosure, "a plurality of" or "the plurality of" means two or more unless otherwise specified.

In the description of some embodiments, terms such as "coupled" and "connected" and their derivatives may be used. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The phrase "applicable to" or "configured to" used herein has an open and inclusive meaning, which does not exclude devices that are applicable to or configured to perform additional tasks or steps.

In addition, the phase "based on" used is meant to be open and inclusive, since a process, step, calculation or other action that is "based on" one or more of the stated conditions or values may, in practice, be based on additional conditions or values beyond those stated.

The terms "about" and "approximately" as used herein include a stated value and an average value within an acceptable range of deviation of a particular value. The acceptable range of deviation is determined by a person of ordinary skill in the art in consideration of the measurement in question and errors associated with the measurement of a particular quantity (i.e., limitations of the measurement system).

Exemplary embodiments are described herein with reference to sectional views and/or plan views as idealized exemplary drawings. In the accompanying drawings, thicknesses of layers and sizes of regions are enlarged for clarity. Variations in shapes relative to the accompanying drawings due to, for example, manufacturing technologies and/or tolerances may be envisaged. Therefore, the exemplary embodiments should not be construed as being limited to the shapes of the regions shown herein, but including deviations in the shapes due to, for example, manufacturing. For example, an etched region shown to have a rectangular shape generally has a feature of being curved. Therefore, the regions shown in the accompanying drawings are schematic in nature, and their shapes are not intended to show actual shapes of the regions in a device, and are not intended to limit the scope of the exemplary embodiments.

As shown in FIG. 1, a liquid crystal display panel 100' in the related art generally includes an array substrate 11', an opposite substrate 12', and a liquid crystal layer 13' disposed between the array substrate 11' and the opposite substrate 12'. The array substrate 11' is provided therein with pixel electrodes 111', common electrode(s) 112' and a plurality of signal lines. The opposite substrate 12' is provided therein with a color filter layer 14'. The color filter layer 14' includes a plurality of filter units 141' and a black matrix pattern 142' that separates the filter units and surrounds all the filter units as a whole.

Figure 2:
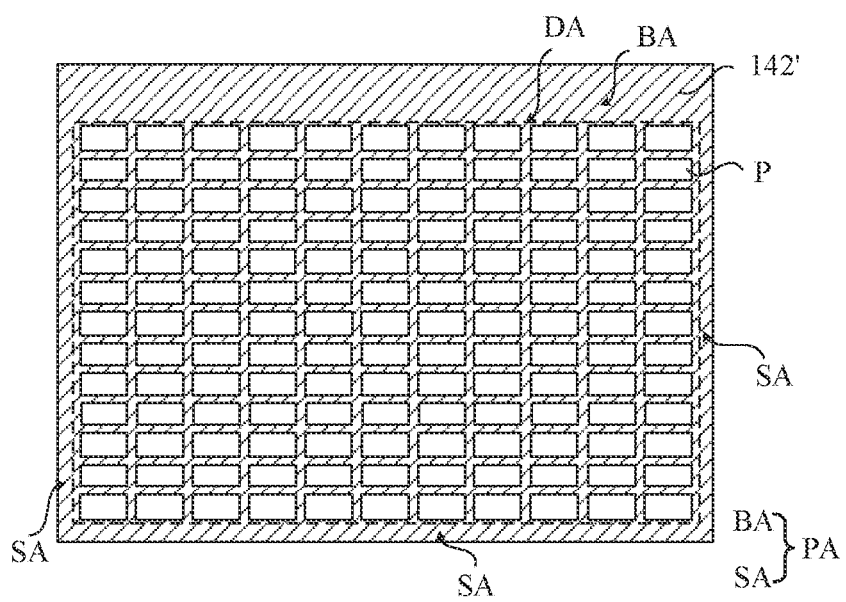
FIG. 2 is a structural diagram of a black matrix pattern in the related art.

As shown in FIG. 2, the black matrix pattern 142' is of a one-piece structure, and the black matrix pattern 142' generally has a strong ability to induce charges. In this way, during a process of turning on or turning off the liquid crystal display panel 100', voltages on the signal lines (e.g., a gate line and a common voltage line) located in the array substrate 11' will jump, which may cause the black matrix pattern 142' to accumulate induced charges. As a result, strong electric fields may be formed between the black matrix pattern 142' and electrodes (e.g., the pixel electrodes and/or the common electrode(s)) located in a display region DA of the liquid crystal display panel 100'. This may cause liquid crystal molecules located in some sub-pixel regions P in the liquid crystal layer 13' to rotate, and further cause light to exit from corresponding sub-pixel regions P, resulting in a problem of abnormal display of the liquid crystal display panel 100'.

Figure 3A:
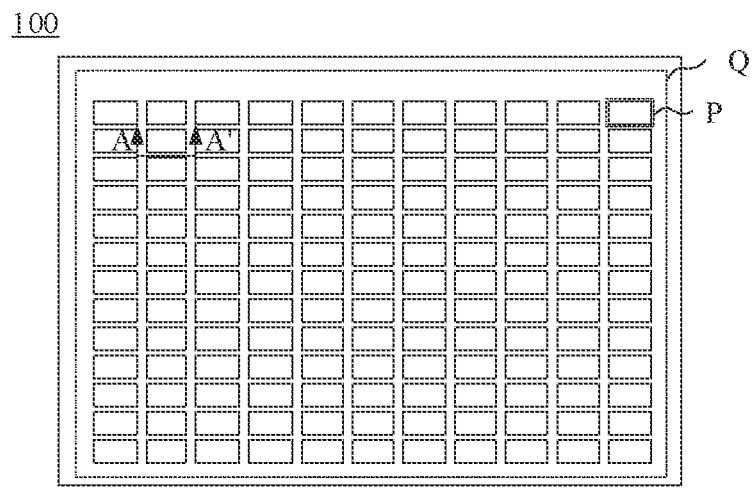
FIG. 3A is a structural diagram of a display panel, in accordance with some embodiments of the present disclosure.

In light of this, some embodiments of the present disclosure provide a display panel. Referring to FIG. 3A, the display panel 100 has a plurality of sub-pixel regions P arranged in an array of a plurality of rows and a plurality of columns, and a light-shielding region Q that separates the sub-pixel regions P and surrounds all the sub-pixel regions P as a whole. That is, a region other than all the sub-pixel regions P in the outer dotted box in FIG. 3A is the light-shielding region Q. In addition, it is worth noting that FIG. 3A shows an example in which an outer edge of the light-shielding region Q is located inside an edge of the display panel 100. However, in some other examples, the outer edge of the light-shielding region Q may also coincide or approximately coincide with the edge of the display panel 100.

Figure 3B:
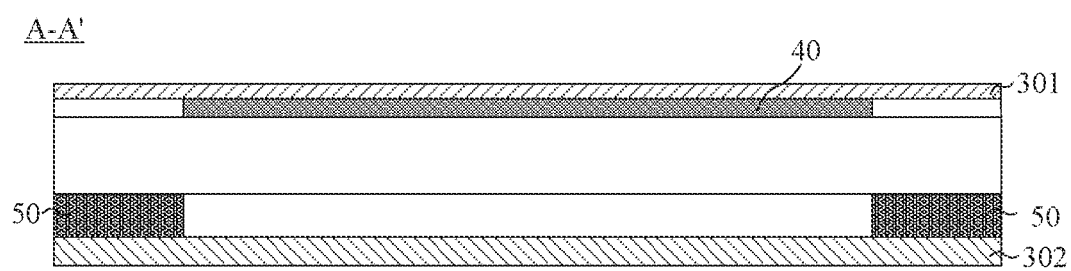
FIG. 3B is a structural diagram of the A-A' section in FIG. 3A.

Referring to FIG. 3B, the display panel 100 includes a first substrate 301, a light-shielding pattern layer 40 located on the first substrate 301, a second substrate 302 disposed opposite to the first substrate 301, and a light-shielding structure layer 50 located on the second substrate 302. The light-shielding pattern layer 40 may be located on a surface of the first substrate 301 proximate to or away from the second substrate 302, and the light-shielding structure layer 50 may be located on a surface of the second substrate 302 proximate to or away from the first substrate 301.

Figure 4:
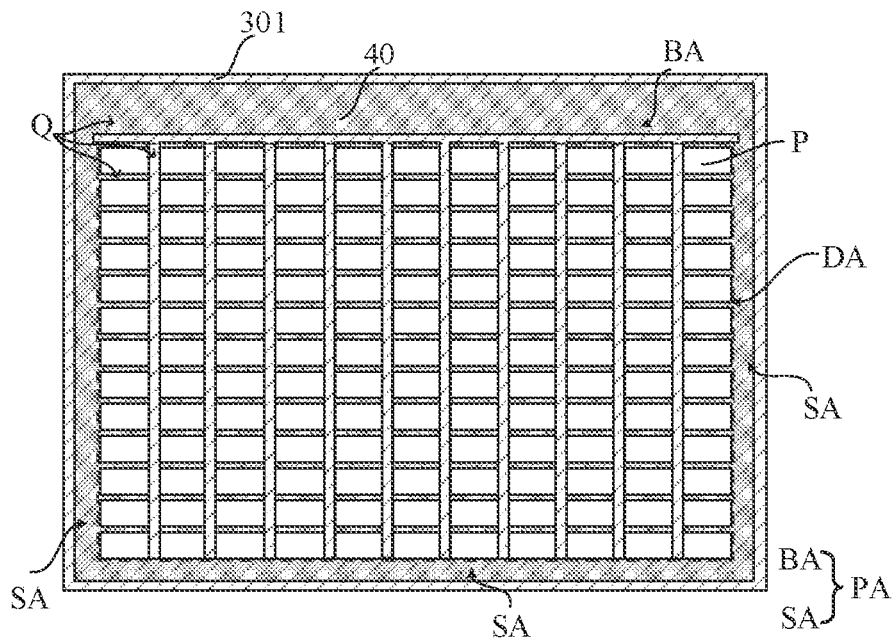
FIG. 4 is a structural diagram of a first substrate on which a light-shielding pattern layer has been formed, in accordance with some embodiments of the present disclosure.

As shown in FIG. 4, the light-shielding pattern layer 40 is located in the light-shielding region Q and covers part of the light-shielding region Q. The light-shielding pattern layer 40 may effectively prevent light emitted by the sub-pixel regions P from leaking out from the part of the light-shielding region Q, and thus prevent affecting a display effect of the display panel 100.

Figure 5:
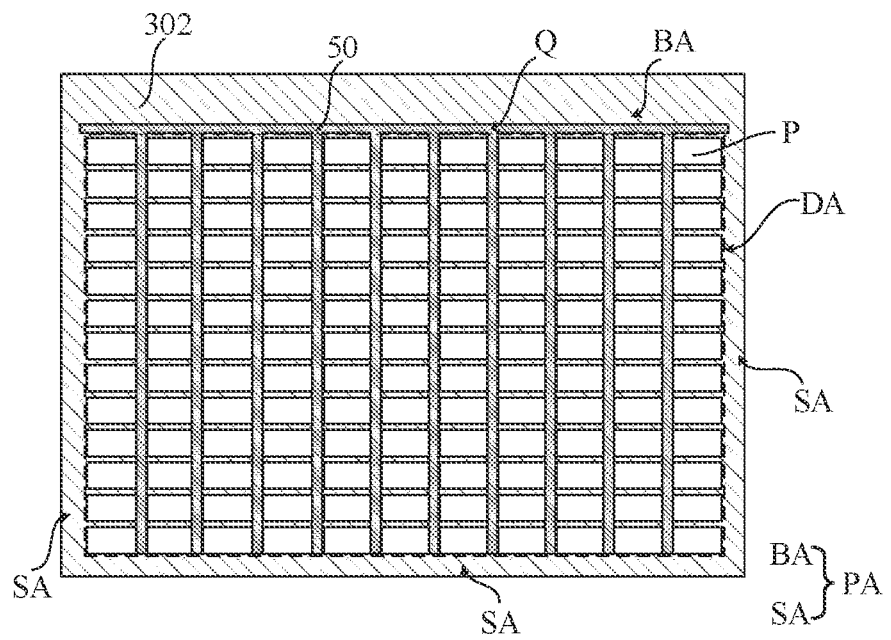
FIG. 5 is a structural diagram of a second substrate on which a light-shielding structure layer has been formed, in accordance with some embodiments of the present disclosure.

As shown in FIGS. 4 and 5, the light-shielding structure layer 50 covers at least a region of the light-shielding region Q that is not covered by the light-shielding pattern layer 40. The light-shielding structure layer 50 may have a good light-shielding effect on the region of the light-shielding region Q covered by the light-shielding structure layer 50, and may effectively avoid light leakage from the region of the light-shielding region Q covered by the light-shielding structure layer 50, thereby ensuring the display effect of the display panel 100.

In some examples, the light-shielding structure layer 50 only covers the region of the light-shielding region Q that is not covered by the light-shielding pattern layer 40, which may help save a material used in the light-shielding structure layer 50 and reduce a production cost of the display panel 100.

In some other examples, the light-shielding structure layer 50 also covers some other regions in addition to the region of the light-shielding region Q that is not covered by the light-shielding pattern layer 40. For example, the other regions may include region(s) of the light-shielding region Q that are covered by the light-shielding pattern layer 40. As another example, the other regions may include partial region(s) in some sub-pixel regions P.

Since the light-shielding structure layer 50 and the light-shielding pattern layer 40 are located on different substrates, the region covered by the light-shielding pattern layer 40 (or the region covered by the light-shielding structure layer 50) may be effectively reduced. This may help reduce the amount of induced charges accumulated on the light-shielding pattern layer 40 (or the light-shielding structure layer 50) when voltages on signal lines in the display panel 100 jumps, and reduce electric fields formed between the light-shielding pattern layer 40 (or the light-shielding structure layer 50) and electrodes (e.g., pixel electrodes and/or common electrode(s)) in a display region of the display panel 100. As a result, the phenomenon of light leakage caused by the rotation of liquid crystal molecules located in some of the sub-pixel regions P in the liquid crystal layer may be ameliorated.

Figure 7:
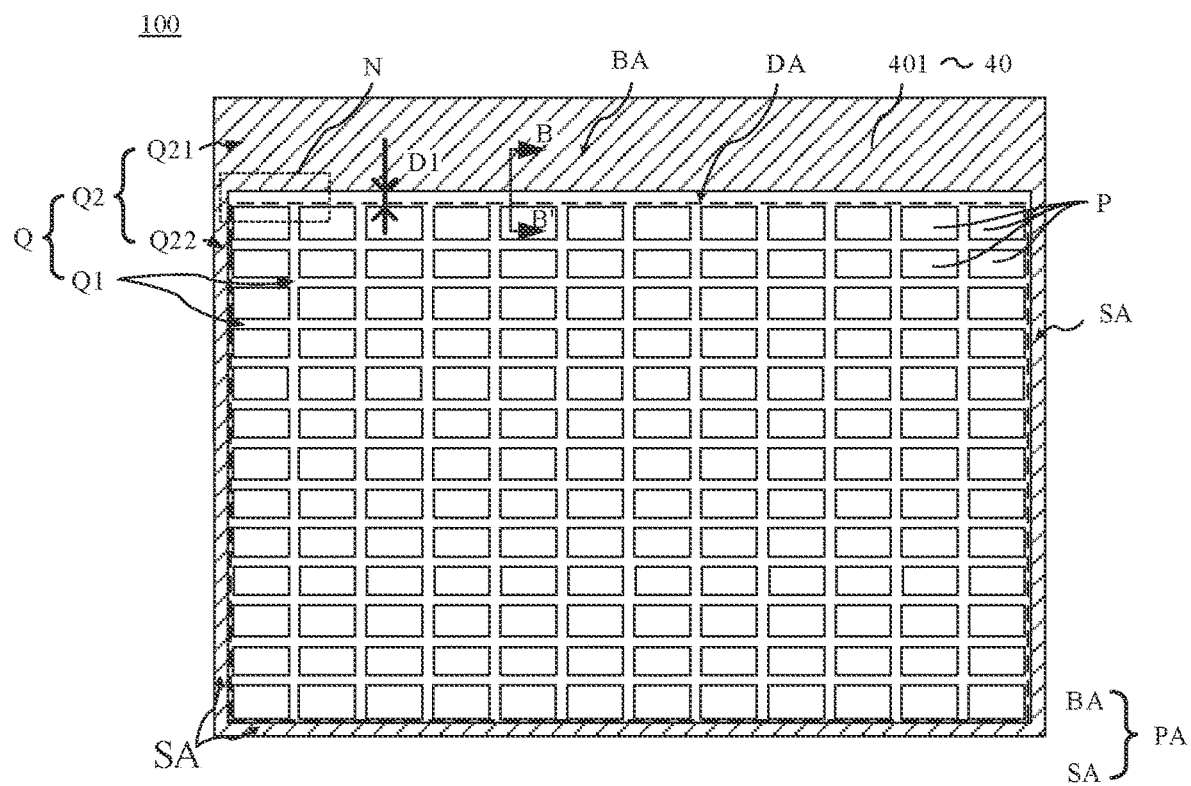
FIG. 7 is a structural diagram of another display panel, in accordance with some embodiments of the present disclosure.
Figure 10:
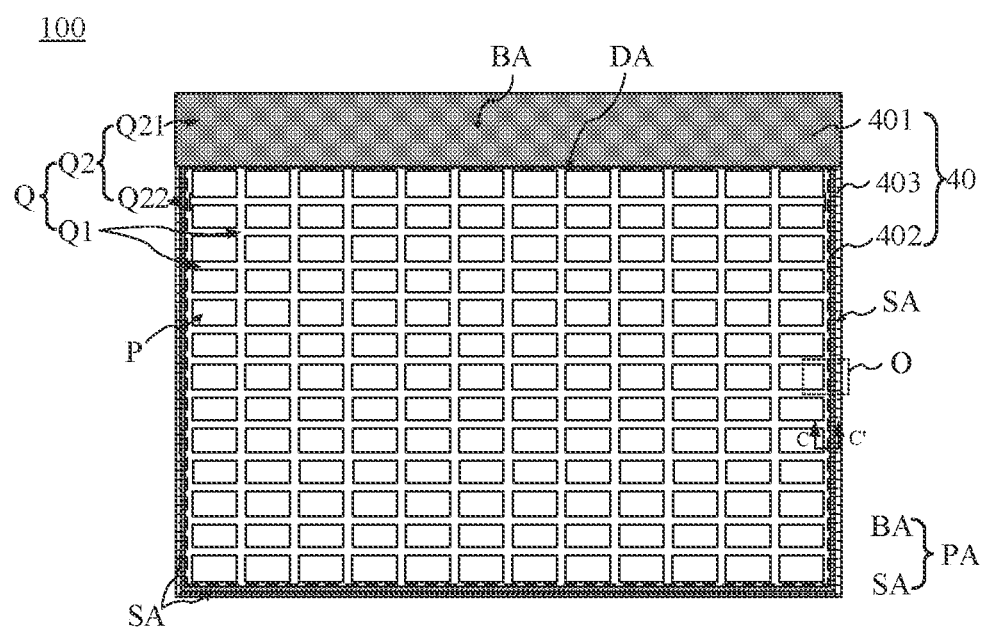
FIG. 10 is a structural diagram of yet another display panel, in accordance with some embodiments of the present disclosure.

In some embodiments of the present disclosure, referring to FIGS. 7 and 10, the light-shielding region Q includes a first light-shielding region Q1 separating the sub-pixel regions P and a second light-shielding region Q2 surrounding all the sub-pixel regions P. The first light-shielding region Q1 and the plurality of sub-pixel regions P constitute the display region DA.

In some embodiments, referring to FIGS. 7 and 10, the display panel 100 has a peripheral region PA surrounding the display region DA. The display region DA is, for example, approximately in a shape of a rectangle. The peripheral region PA may surround part of the display region DA, or may surround the entire display region DA (as shown in FIGS. 7 and 10).

The peripheral region PA includes a bonding region BA located on a side of the display region DA. The bonding region BA may be used to bond a flexible printed circuit, and the bonding region BA is provided therein with a plurality of signal lines that may extend into the display region DA.

Figure 6:
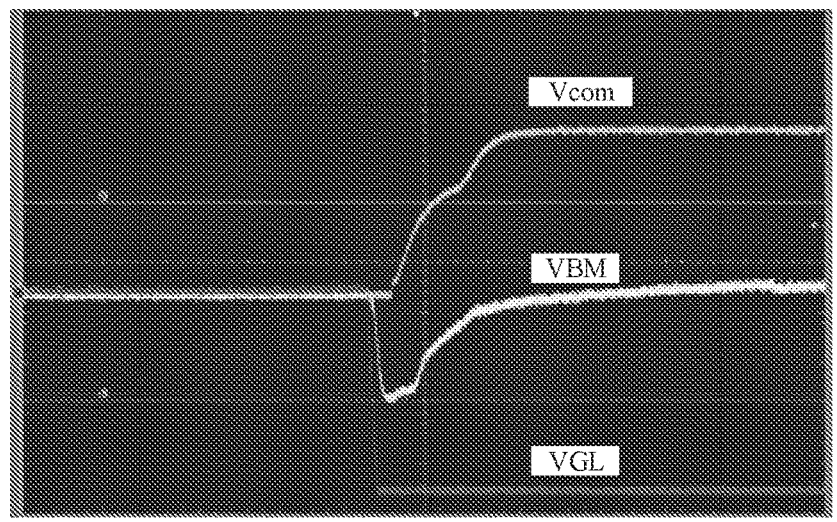

In the related art, as shown in FIG. 2, in order to prevent light leakage in the peripheral region PA, the black matrix pattern 142' is generally arranged to cover some sub-pixel regions P located at an edge of the display region DA. In addition, in order to realize a narrow bezel design, a gate driver on array (GOA) circuit is provided in the bonding region BA. However, in the case where the GOA circuit is provided in the bonding region BA, many signal lines (e.g., the gate line, the common voltage line, and clock signal lines) are arranged in the bonding region BA. As shown in FIG. 6 (in which the abscissa represents time and the ordinate represents a voltage value), when the liquid crystal display panel is turned on, voltages on the gate line (e.g., a low-level signal line VGL) and the common voltage line Vcom that are located in the bonding region BA jump sharply, and a voltage on the black matrix pattern 142' (VBM) changes greatly within a period after the liquid crystal display panel is turned on. That is, during a power-on process, voltage jumps on the signal lines may cause a portion of the black matrix pattern 142' located in the bonding region BA to accumulate induced charges. The charges accumulated on the portion of the black matrix pattern 142' are easily transferred to a region closer to the display region DA, so that electric fields are formed between the black matrix pattern 142' and the electrodes (e.g., the pixel electrodes and/or the common electrode(s)) in the display region DA, which causes liquid crystal molecules in the liquid crystal layer 13' proximate to the bonding region BA to rotate. As a result, there may be a light leakage problem in sub-pixel regions P in the display region DA proximate to the bonding region BA, which may cause a problem of a bright line at a bottom row of the liquid crystal display panel 100'.

Figure 8:
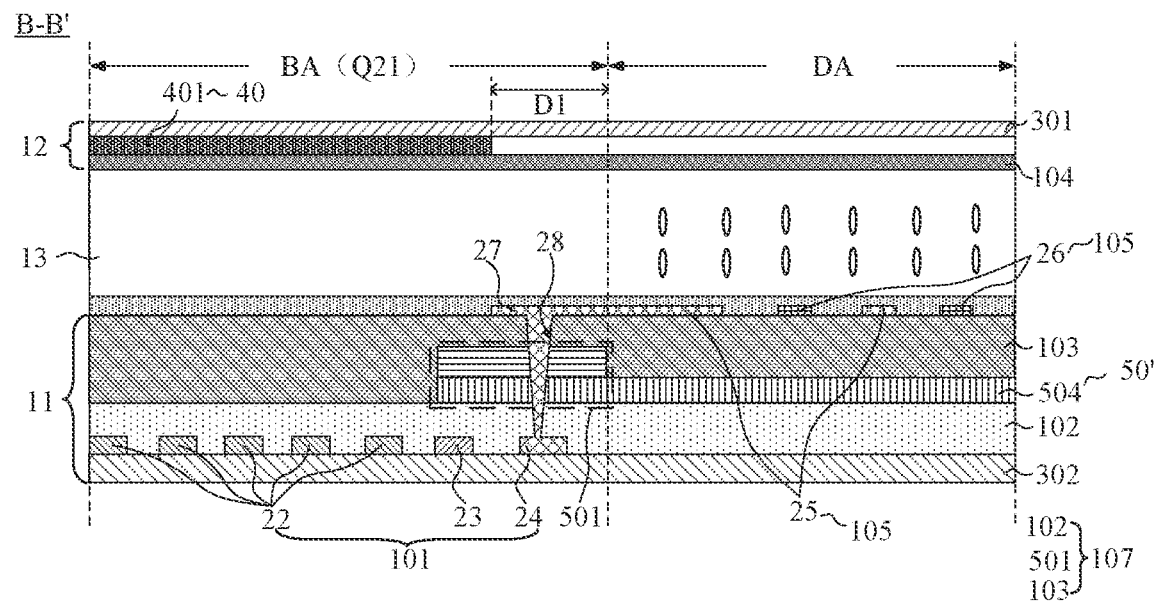
FIG. 8 is a structural diagram of the B-B' section in FIG. 7.
Figure 9:
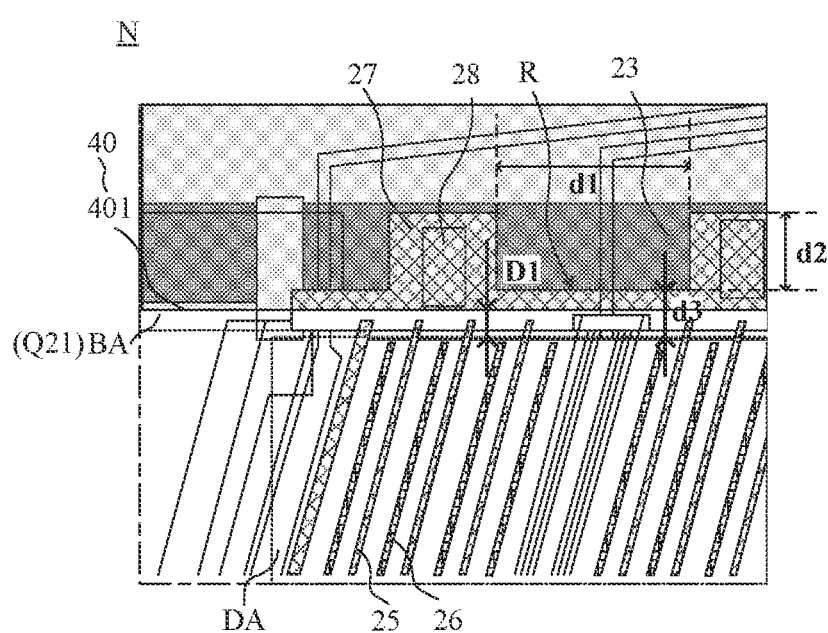
FIG. 9 is a structural diagram of the region N in FIG. 7.

In light of this, in some embodiments of the present disclosure, referring to FIGS. 7 to 9, the second light-shielding region Q2 includes a first light-shielding sub-region Q21 located on a bonding side of the display panel 100. The light-shielding pattern layer 40 includes a first light-shielding portion 401 located in the first light-shielding sub-region Q21. A first gap D1 exists between the first light-shielding portion 401 and the display region DA. The existence of the first gap D1 may increase a distance between the first light-shielding portion 401 and the electrode located in the display region DA, so that it is difficult for the strong electric field to be formed between the first light-shielding portion 401 and the electrode located in the display region DA. Therefore, it is difficult to cause liquid crystal molecules proximate to the bonding region BA to rotate, and it is possible to effectively avoid a problem of light leakage in the sub-pixel regions P in the display region DA proximate to the bonding region BA caused by rotation of the liquid crystal molecules proximate to the bonding region B.

In some examples, in a direction perpendicular to an extension direction of a side of the display region DA proximate to the first light-shielding portion 401, a dimension of the first gap D1 is greater than or equal to 5 μm. In this way, when the voltages on the signal lines jump, a voltage of the first light-shielding portion 401 generated by coupling may not be enough to form an electric field (which is strong enough to cause the liquid crystal molecules proximate to the bonding side to rotate) with the electrodes in the display region DA. Therefore, it may be possible to avoid the problem of light leakage in the sub-pixel regions P proximate to the bonding region DA caused by the rotation of the liquid crystal molecules proximate to the bonding region DA due to voltage jumps on the signal lines.

In some examples, as shown in FIG. 8, the light-shielding structure layer 50 includes a first light-shielding structure 501. An orthographic projection of the first light-shielding structure 501 on the first substrate 301 covers the first gap D1. The first light-shielding structure 501 may shield the first gap D1 from light, thereby effectively avoiding the problem of light leakage in the region where the first gap D1 is located.

For example, the orthographic projection of the first light-shielding structure 501 on the first substrate 301 approximately coincides with the first gap D1, which may help save a material of the first light-shielding structure 501 and reduce a manufacturing cost of the display panel 100.

As another example, referring to FIG. 8, the first light-shielding structure 501 extends to a region of the bonding region BA where the first light-shielding portion 401 is located in addition to covering the first gap D1. In this way, the first light-shielding structure 501 has a larger light-shielding area, and helps provide a better light-shielding effect on the bonding region BA.

In some examples, referring to FIG. 8, the first light-shielding structure 501 includes at least two filter units 504 of different colors that are stacked. For example, the first light-shielding structure 501 includes a blue filter unit and a red filter unit. A stacked structure of the blue filter unit and the red filter unit has a good light-shielding effect, which may provide a good light-shielding effect on the first gap D1 and thus effectively avoid the problem of light leakage in the region where the first gap D1 is located.

With continued reference to FIG. 8, in some examples, the first substrate 301 is located in an opposite substrate 12, and the second substrate 302 is located in an array substrate 11. A liquid crystal molecular layer 13 is provided between the opposite substrate 12 and the array substrate 11, and liquid crystal molecules are provided in the liquid crystal molecular layer 13 at a position corresponding to the display region DA.

As for the opposite substrate 12, in some examples, as shown in FIG. 8, a planarization layer 104 may further be provided on a side of the light-shielding pattern layer 40 away from the first substrate 301.

As for the array substrate 11, in some examples, as shown in FIG. 8, a first conductive layer 101, at least one insulating layer 107 (e.g., a gate insulating layer 102, the first light-shielding structure 501 and an organic film layer 103 as shown in FIG. 8) and a second conductive layer 105 may further be provided on a side of the second substrate 302 proximate to the first substrate 301 in sequence.

For example, the gate insulating layer 102 is located on a side of the first conductive layer 101 away from the second substrate 302. The first light-shielding structure 501 and the organic film layer 103 are disposed on a side of the gate insulating layer 102 away from the second substrate 302 in sequence.

Referring to FIGS. 8 and 9, the first conductive layer 101 includes a common voltage line 24 located in the first light-shielding sub-region Q21. The second conductive layer 105 includes a plurality of common electrodes 25 located in the plurality of sub-pixel regions P, and a conductive connection portion 27 connecting to the plurality of common electrodes 25. The conductive connection portion 27 is located in the first light-shielding sub-region Q21. The conductive connection portion 27 is connected to the common voltage line 24 through a conductive material in at least two via holes 28 in the insulating layer(s). A portion of the conductive connection portion 27 located between two adjacent via holes 28 has a hollowed-out portion R. The arrangement of hollowed-out portion R may reduce a coverage area of the conductive connection portion 27, which may reduce an overlapping area between an orthographic projection of the conductive connection portion 27 on the first substrate 301 and an orthographic projection of the first light-shielding portion 401 on the first substrate 301. Therefore, it may help prevent the first light-shielding portion 401 from generating a lot of charges caused by a voltage jump on the conductive connection portion 27 due to the voltage jump on the common voltage line 24. As a result, it may be possible to effectively ameliorate the problem of light leakage in the sub-pixel regions in the display region DA proximate to the bonding region BA due to the rotation of the liquid crystal molecules proximate to the bonding region DA.

In some examples, referring to FIG. 9, the hollowed-out portion R is a recess-shaped opening, and an opening end of the recess-shaped opening faces away from the display region DA. The recess-shaped opening may be set according to at least one of the following manners: a width d1 of the recess-shaped opening is approximately 32 μm; or a depth d2 of the recess-shaped opening is approximately 13 μm; or a distance d3 between a bottom surface of the recess-shaped opening and the display region DA is approximately 8 μm. For example, the width d1 of the recess-shaped opening is approximately 32 μm, the depth d2 of the recess-shaped opening is approximately 13 μm, and the distance d3 between the bottom surface of the recess-shaped opening and the display region DA is approximately 8 μm.

It will be noted that, "approximately" may, for example, refer to the stated value (for example, d1 is 32 μm), or may be 10% above or below the stated value. That is, d1 may be any numerical value greater than or equal to 31.68 μm and less than 32 μm, or may be any numerical value greater than 32 μm and less than or equal to 32.32 μm. Of course, the numerical values of d2 and d3 may also be set with reference to the above method, and details will not be repeated here.

A width direction of the recess-shaped opening may be a direction in which two adjacent via holes 28 are arranged, and a depth direction of the recess-shaped opening may be a direction perpendicular to the width direction. The bottom surface of the recess-shaped opening may be a surface, closest to the display region DA, of the recess-shaped opening.

In this way, the overlapping area between the orthographic projection of the conductive connection portion 27 on the first substrate and the orthographic projection of the first light-shielding portion 401 on the first substrate may be reduced, which may help reduce the amount of charges generated on the first light-shielding portion 401 and thus effectively ameliorate the problem of light leakage that may occur in a region of the display region DA proximate to the bonding region BA.

In some examples, referring to FIGS. 8 and 9, in the bonding region BA, the first conductive layer 101 further includes clock signal lines 22 and a low-level signal line 23. In this way, the number of signal lines on other sides of the display panel 100 may be reduced, which facilitates the narrow bezel design of the display panel 100.

For example, in the sub-pixel regions P, the display panel 100 further includes a plurality of pixel electrodes 26 disposed in a same layer as the plurality of common electrodes 25. The plurality of common electrodes 25 and the plurality of pixel electrodes 26 are arranged at intervals. The pixel electrode 26 and the common electrode 25 each may be provided as a comb-tooth structure including a plurality of strip-shaped sub-electrodes.

It will be noted that, as shown in FIG. 2, in a case where, in addition to the bonding region BA, the peripheral region PA further includes a surrounding region SA arranged along the display region DA, the black matrix pattern 142' in the related art also covers the surrounding region SA. When the display panel 100' comes into contact with an external charged body (e.g., a human body), static electricity is easily introduced, and charges are easily accumulated on a portion of the black matrix pattern 142' located in the surrounding region SA, thereby causing liquid crystal molecules in the display region DA proximate to the surrounding region SA to rotate. For example, when the display panel 100' is in a normally black state, the charges accumulated on the portion of the black matrix pattern 142' located in the surrounding region SA may cause a display screen to appear green or white, resulting in a poor display image.

In light of this, in some embodiments of the present disclosure, as shown in FIG. 10, the second light-shielding region Q2 further includes a second light-shielding sub-region Q22 other than the first light-shielding sub-region Q21. The light-shielding pattern layer 40 of the display panel 100 further includes a second light-shielding portion 402 and a third light-shielding portion 403.

The second light-shielding portion 402 is located in the second light-shielding sub-region Q22, and the second light-shielding portion 402 extends from a boundary of the display region DA to a side away from the display region DA. For example, the second light-shielding portion 402 may be connected to the first light-shielding portion 401 located in the first light-shielding sub-region Q21. For example, the second light-shielding portion 402 and the first light-shielding portion 401 together enclose the display region DA, thereby effectively preventing the phenomenon of light leakage around the display region DA.

The third light-shielding portion 403 is located in the second light-shielding sub-region Q22 and located on a side of the second light-shielding portion 402 away from the display region DA. For example, the third light-shielding portion 403 may completely surround the second light-shielding portion 402. In this case, portions of the third light-shielding portion 403 located on two sides of the display region DA are both connected to the first light-shielding portion. As another example, the third light-shielding portion 403 may partially surround the second light-shielding portion 402. In this case, the third light-shielding portion 403 is not connected to the first light-shielding portion, or part of the third light-shielding portion 403 is connected to the first light-shielding portion.

Figure 11:
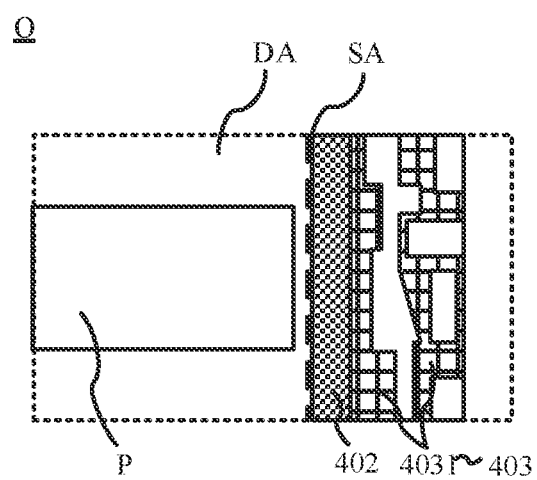
FIG. 11 is a structural diagram of the region O in FIG. 10.
Figure 12:
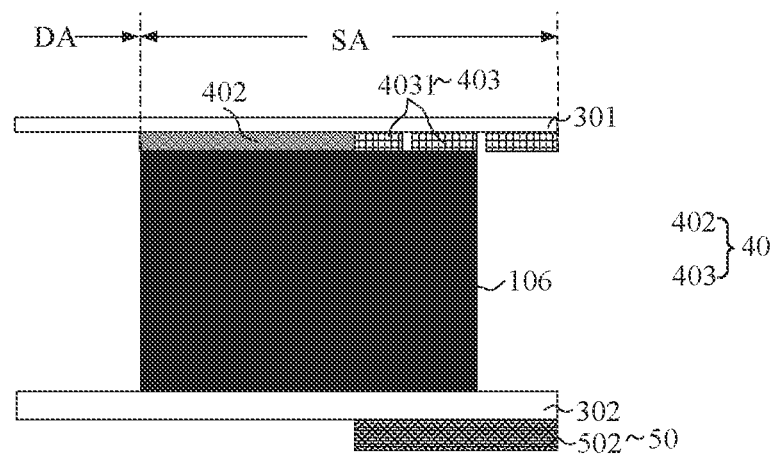
FIG. 12 is a structural diagram of the C-C' section in FIG. 10.
Figure 13:
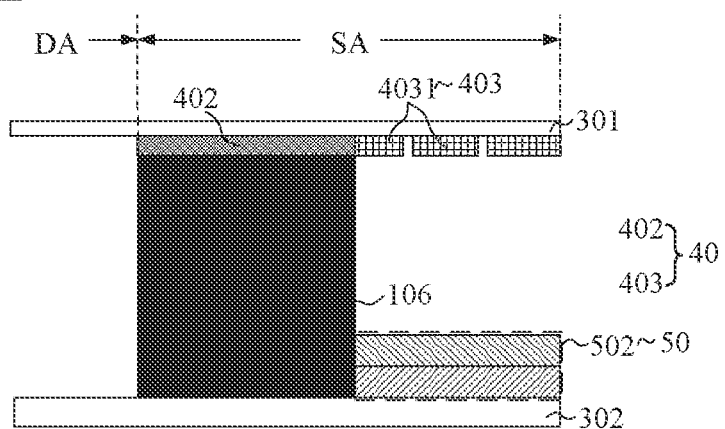
FIG. 13 is another structural diagram of the C-C' section in FIG. 10.

For example, as shown in FIGS. 11 to 13, the third light-shielding portion 403 of the display panel 100 includes a plurality of light-shielding sub-blocks 4031 arranged at intervals. A light-shielding sub-block 4031 close to the display region DA is connected to the second light-shielding portion 402.

In this way, by arranging the plurality of light-shielding sub-blocks 4031 at intervals, it may be possible to prevent the static electricity introduced into a light-shielding sub-block 4031 far away from the display region DA from being conducted to the second light-shielding portion 402, thereby avoiding the problem of abnormal image display caused by the static electricity introduced to the second light-shielding portion 402 when the display panel is in the normally black state. In addition, during a manufacturing process of cutting the light-shielding pattern layer 40, if a certain light-shielding sub-block 4031 cracks or falls, a light-shielding sub-block 4031 spaced apart from the certain light-shielding sub-block 4031 will be less affected, which helps ensure the light-shielding effect provided by the light-shielding pattern layer 40 for the surrounding region SA. As a result, the display quality of the display panel 100 is improved.

In some examples, as shown in FIG. 11, at least part of the light-shielding sub-blocks 4031 are of different shapes. Therefore, even if the light leakage occurs in the surrounding region SA, the leaked light will become more uniform and soft.

For example, referring to FIG. 11, shapes of the light-shielding sub-blocks 4031 may include at least one of a circle, a polygon, and a mosaic shape. The shape of the light-shielding sub-block 4031 may be specifically designed according to practical applications, and the shape of the light-shielding sub-block 4031 is not limited in the embodiments of the present disclosure.

In some embodiments, as shown in FIGS. 12 and 13, the light-shielding structure layer 50 further includes a second light-shielding structure 502, and the second light-shielding structure 502 is located on a side of the second substrate 302 proximate to or away from the first substrate 301. An orthographic projection of the second light-shielding structure 502 on the first substrate 301 covers at least a region located on a side of the second light-shielding portion 402 away from the display region DA.

In some examples, as shown in FIG. 12, the second light-shielding structure 502 is located on the side of the second substrate 302 away from the first substrate 301, and the second light-shielding structure 502 includes black ink. The black ink has a good light-shielding effect, and the black ink is used for covering and shielding a region where the third light-shielding portion 403 is located, which may help avoid the light leakage in the surrounding region SA.

For example, the black ink may be arranged in a same layer as a polarizer, and the polarizer is intended to reserve a position for the black ink. In this way, a surface of the polarizer and a surface of the black ink that are away from the second substrate 302 are relatively flat as a whole, which helps improve the aesthetic of the display panel 100.

In some other examples, as shown in FIG. 13, the second light-shielding structure 502 is located on the side of the second substrate 302 proximate to the first substrate 301, and the second light-shielding structure 502 includes at least two filter units of different colors that are stacked. For example, the second light-shielding structure 502 includes a blue filter unit and a red filter unit that are stacked. A stacked structure of the blue filter unit and the red filter unit has a good light-shielding effect, which may provide better shielding for the region where the third light-shielding portion 403 is located and thus help avoid the light leakage in the surrounding region SA.

For example, a protective layer may be provided on a side of the stacked structure of the blue filter unit and the red filter unit away from the second substrate 302, so as to protect the stacked structure and play a role of flatness.

In some examples, with continued reference to FIGS. 12 and 13, the display panel 100 further includes a frame sealant 106 located between the second substrate 302 and the first substrate 301. The frame sealant 106 is located in the second light-shielding sub-region Q22. In the case where the second light-shielding structure 502 is located on the side of the second substrate 302 proximate to the first substrate 301, as shown in FIG. 13, an orthographic projection of the frame sealant 106 on the first substrate 301 does not overlap with the orthographic projection of the second light-shielding structure 502 on the first substrate 301. For example, the orthographic projection of the frame sealant 106 on the first substrate 301 is located within an orthographic projection of the second light-shielding portion 402 on the first substrate 301. With such design, it may be possible to effectively prevent the frame sealant 106 from covering the stacked structure of the blue filter unit and the red filter unit, a level difference from being formed and affecting a frame sealing effect of the frame sealant 106.

In addition, in the related art, as shown in FIG. 2, a portion of the black matrix pattern 142' located in the display region DA is interlaced and connected. Therefore, if the voltages on the signal lines (e.g., the gate line and the common voltage line) in the liquid crystal display panel 100' jump sharply when the liquid crystal display panel 100' is turned on, induced charges may be accumulated on the portion of the black matrix pattern 142' located in the display region DA. When the amount of the induced charges accumulated on the black matrix pattern 142' is relatively large, strong electric fields may be formed between the black matrix pattern 142' and the electrodes (e.g., the pixel electrodes and/or the common electrode(s)) in the display region, which may cause liquid crystal molecules located in the display region DA to rotate and thus cause a screen flicker when the liquid crystal display panel 100' is turned on.

Figure 14:
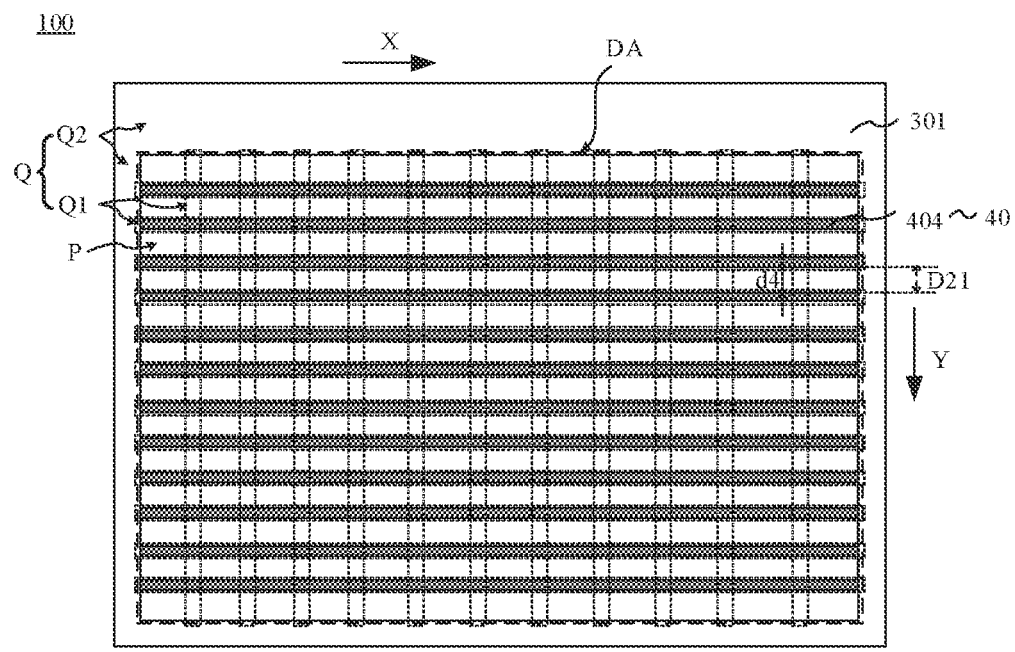
FIG. 14 is a structural diagram of yet another display panel, in accordance with some embodiments of the present disclosure.
Figure 15:
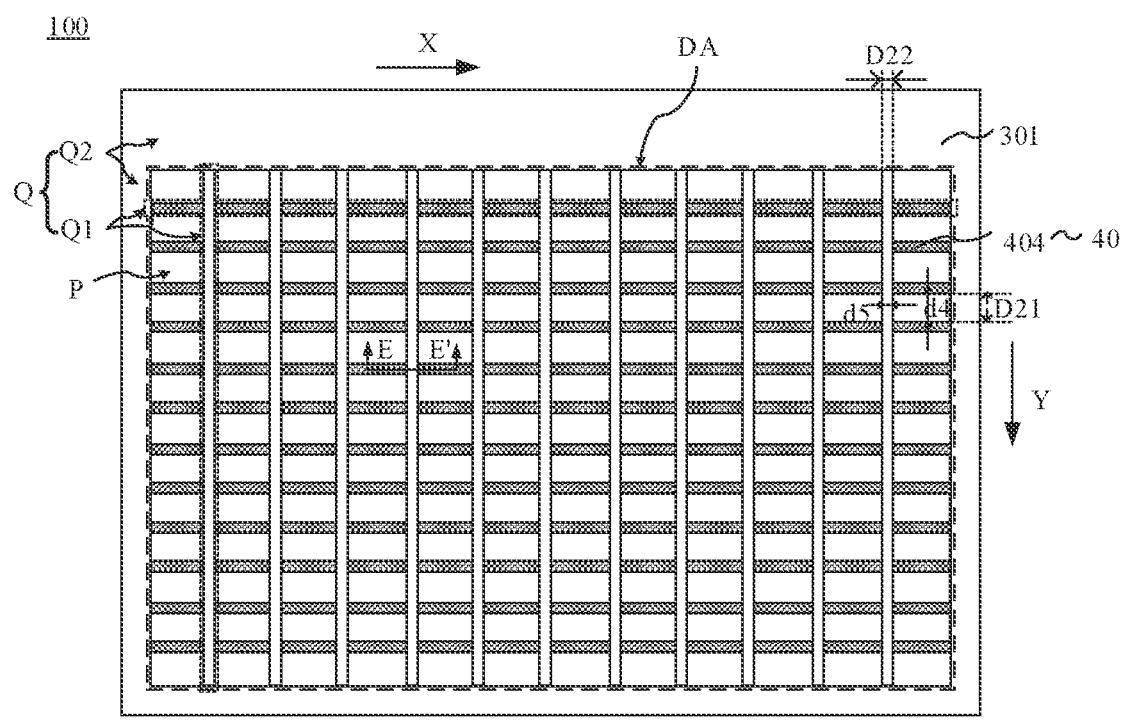
FIG. 15 is a structural diagram of yet another display panel, in accordance with some embodiments of the present disclosure.

In light of this, in some embodiments of the present disclosure, referring to FIGS. 14 and 15, the light-shielding pattern layer 40 further includes a plurality of fourth light-shielding portions 404 located in the first light-shielding region Q1 (as indicated by dotted boxes in the display region DA in FIGS. 14 and 15), and a second gap (e.g., a second column direction gap D21 in a column direction in FIGS. 14 and 15, or a second row direction gap D22 in a row direction in FIG. 15) exists between two adjacent fourth light-shielding portions 404.

In this way, the second gap may separate the two adjacent fourth light-shielding portions 404, thereby effectively preventing charges on the two adjacent fourth light-shielding portions 404 from flowing. In this way, during the power-on process, the voltages on the signal lines located in the display region DA jump, and charges generated on the plurality of fourth light-shielding portions 404 cannot be accumulated because adjacent fourth light-shielding portions 404 are separated. In this way, it may be possible to reduce the electric fields between the light-shielding pattern layer 40 and the electrodes located in the display region DA and prevent liquid crystal molecules located in the display region DA from rotating, thereby effectively ameliorating the screen flicker phenomenon of the display panel, In some embodiments, as shown in FIGS. 14 and 15, at least one fourth light-shielding portion 404 is disposed between two adjacent rows of sub-pixel regions P. The fourth light-shielding portion 404 extends in the row direction X and extends across at least one sub-pixel region P in the row direction X.

It will be noted that, the "at least one fourth light-shielding portion 404" may also be disposed between two adjacent columns of sub-pixel regions P. In this case, the fourth light-shielding portion 404 extends in the column direction Y and extends across at least one sub-pixel region P in the column direction Y.

In some examples, a sub-pixel region P may correspond to one sub-pixel. For example, three adjacent sub-pixel regions P in the row direction X may correspond to a red sub-pixel, a green sub-pixel, and a blue sub-pixel.

In some examples, referring to FIG. 14, a single fourth light-shielding portion 404 is disposed between two adjacent rows of sub-pixel regions P, and the fourth light-shielding portion 404 extends from a first sub-pixel region P to a last sub-pixel region P in the row direction X.

With continued reference to FIG. 14, for example, two ends of the fourth light-shielding portion 404 in the row direction X are connected to a portion of the light-shielding pattern layer 40 located in the second light-shielding region Q2 (e.g., the second light-shielding portion 402). In this way, sub-pixel regions P located at edge positions in the row direction X may be well shielded, thereby effectively avoiding a problem of light mixing or light leakage at edge positions of the display region DA.

Based on this, two adjacent fourth light-shielding portions 404 arranged in the column direction Y have the second column direction gap D21 therebetween. For example, a dimension of the second column direction gap D21 in the column direction Y is approximately equal to a first distance d4 of a sub-pixel region P located between the two adjacent fourth light-shielding portions 404 in the column direction Y. In this way, on a premise that regions located on both sides of the sub-pixel region P in the column direction Y are well shielded, the sub-pixel corresponding to the sub-pixel region P may achieve a good light extraction rate.

In some other examples, referring to FIG. 15, fourth light-shielding portions 404 are disposed between two adjacent rows of sub-pixel regions P. For example, the number of the fourth light-shielding portions 404 between the two adjacent rows of sub-pixel regions P is equal to the number of sub-pixel regions P in a row of sub-pixel regions P in the two adjacent rows of sub-pixel regions P.

With continued reference to FIG. 15, for example, each fourth light-shielding portion 404 corresponds to a sub-pixel region P in a row of sub-pixel regions P. In this case, each fourth light-shielding portion 404 extends across a corresponding sub-pixel region P in the row direction X. For example, each fourth light-shielding portion 404 extends from a side to another side of the corresponding sub-pixel region P. In this way, each fourth light-shielding portion 404 may shield a region between two adjacent sub-pixel regions P in the column direction Y from light, thereby effectively preventing light mixing between the two adjacent sub-pixels in the column direction Y. In addition, since the fourth light-shielding portion 404 only extends from the side to the another side of the corresponding sub-pixel region P, a coverage area of the fourth light-shielding portion 404 may be reduced, thereby effectively reducing a material used in the fourth light-shielding portions 404 and reducing a material cost.

Based on this, two adjacent fourth light-shielding portions 404 arranged in the column direction Y have the second column direction gap D21 therebetween. For example, a dimension of the second column direction gap D21 in the column direction Y is approximately equal to the first distance d4 of a sub-pixel region P located between the two adjacent fourth light-shielding portions 404 in the column direction Y.

In addition, two adjacent fourth light-shielding portions 404 in the row direction X have the second row direction gap D22 therebetween. For example, a dimension of the second row direction gap D22 in the row direction X is approximately equal to a second distance d5 between two adjacent sub-pixel regions P in the row direction X that are adjacent to the two adjacent fourth light-shielding portions 404.

In addition, the "sub-pixel region" may refer to an effective light-emitting region of a sub-pixel. The "row direction" and "column direction" may respectively refer to a horizontal direction and a vertical direction that are parallel to a display surface of the display panel 100, and may also respectively refer to the vertical direction and the horizontal direction that are parallel to the display surface of the display panel 100; moreover, they may also refer to any two directions that intersect each other and are parallel to the display surface of the display panel 100. Of course, the word "intersect" may mean that the two directions are perpendicular to each other, and may also mean that there is a certain angle greater than 0 degrees and less than 90 degrees between the two directions.

Figure 16:
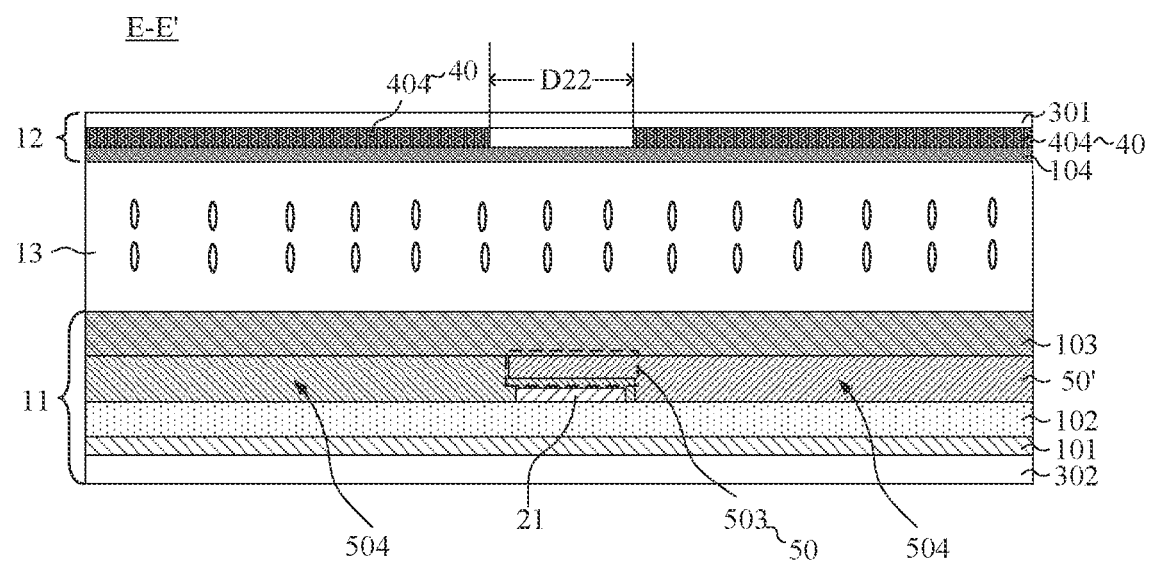
FIG. 16 is a structural diagram of the E-E' section in FIG. 15.

In some embodiments, as shown in FIG. 16, the light-shielding structure layer 50 further includes a plurality of third light-shielding structures 503, and each third light-shielding structure 503 separates two adjacent columns of sub-pixel regions P.

With such design, the light-shielding pattern layer 40 is used to shield a region between two adjacent rows of sub-pixel regions P from light, and the plurality of third light-shielding structures 503 each are used to shield a region between two adjacent columns of sub-pixel regions P from light. In this way, a region around each sub-pixel region P is well shielded, thereby avoiding light mixing between two adjacent sub-pixels. In addition, an arrangement of the third light-shielding structure 503 may also reduce a coverage area of the light-shielding pattern layer 40, which may reduce the amount of induced charges on the light-shielding pattern layer 40, reduce voltage differences between the light-shielding pattern layer 40 and the electrodes in the display region DA, and thus effectively avoid the problem of screen flicker of the display panel caused by the voltage jumps on the signal lines.

In some examples, referring to FIG. 16, the display panel 100 further includes a color filter layer 50' located on the second substrate 302. The color filter layer 50' includes a plurality of filter units 504; each filter unit 504 covers a column of sub-pixel regions P, and two adjacent filter units 504 allow light of different colors to pass through. Each filter unit 504 may filter light emitted by sub-pixel regions P in the column, so that the sub-pixel regions P in the column emit light of a color corresponding to the filter unit 504.

For example, with continued reference to FIG. 16, two adjacent filter units 504 partially overlap, and an overlapping portion of the two adjacent filter units 504 is used as the third light-shielding structure 503. In this way, it may facilitate to manufacture the light-shielding structure layer 50, simplify the manufacturing and production process, and reduce the manufacturing cost of the display panel 100.

As another example, the third light-shielding structure 503 includes at least two filter units 504 of different colors that are stacked. For example, the third light-shielding structure 503 includes a blue color filter unit and a red color filter unit that are stacked. A stacked structure of the blue filter unit and the red filter unit has a good light-shielding effect, which may provide a good light-shielding effect on the region between two adjacent sub-pixel regions P in the row direction X. As a result, it effectively avoids the problem of light mixing on the display panel 100 and thus improves the image display effect of the display panel 100.

In some examples, referring to FIGS. 8 and 16, the color filter layer 50' is located between the gate insulating layer 102 and the organic film layer 103. Since the color filter layer 50' is disposed in the array substrate 11, it may facilitate alignment of the color filter layer 50' with the sub-pixels in the array substrate 11. In addition, a width of the third light-shielding structure 503 may be set small, which may improve an aperture ratio of the display panel 100.

Based on this, the color filter layer 50' may also be manufactured together with the light-shielding structure layer 50, which may reduce the number of processes and improve the production efficiency.

In some examples, with continued reference to FIG. 16, data lines 21 are provided between the gate insulating layer 102 and the color filter layer 50', and the data lines 21 extend along the column direction Y. For example, the data lines 21 are located in part of the first light-shielding region Q1 in the column direction Y. In this way, the data lines 21 may block light emitted by a backlight source of a liquid crystal display device, thereby effectively avoiding the problem of light mixing between two adjacent sub-pixels in the row direction X.

A distance between the opposite substrate 12 and the array substrate 11 may serve as a cell gap of the display panel 100. In some examples, in order to improve a response speed of the liquid crystal molecules and reduce an operating voltage for controlling the liquid crystal molecules to rotate, the cell gap of the display panel 100 is set to be relatively small. However, in the case where the cell gap of the display panel 100 is small, a distance between the light-shielding pattern layer 40 and the first conductive layer 101 is small. In addition, since the first conductive layer 101 includes the gate line and the common voltage line, when voltages on the gate line and the common voltage line in the first conductive layer 101 jump, induced charges is easily accumulated on the light-shielding pattern layer 40. In the embodiments of the present disclosure, by arranging the plurality of fourth light-shielding portions 404, which are arranged at intervals and located in the light-shielding pattern layer 40, in the first light-shielding region Q1, it may be possible to better prevent accumulation of the charges on the fourth light-shielding portions 404 of the light-shielding pattern layer 40 located in the display region DA, and reduce electric fields between the light-shielding pattern layer 40 and the electrodes (e.g., the pixel electrodes and/or the common electrode(s)) in the display region DA, thereby effectively ameliorating the phenomenon of screen flicker of the display panel.

Figure 17:
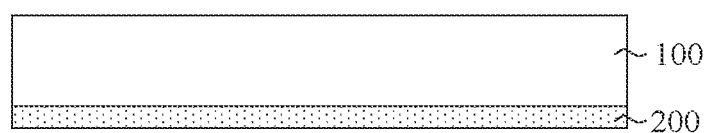
FIG. 17 is a structural diagram of a display device, in accordance with some embodiments of the present disclosure.

Some embodiments of the present disclosure provide a display device. As shown in FIG. 17, the display device 300 includes a backlight source 200 and the display panel 100 as described in any of the above embodiments. The display device 300 may at least reduce the amount of induced charges accumulated on the light-shielding pattern layer 40 (or the light-shielding structure layer 50) when the voltages on the signal lines (e.g., the gate line and the common voltage line) in the display panel 100 jumps, thereby effectively ameliorating the phenomenon of light leakage caused by the rotation of liquid crystal molecules due to the voltage jumps on the signal lines. In addition, the display device 300 further has other beneficial effects of the display panel 100 provided in some of the above embodiments, and details will not be repeated here.

Figure 18:
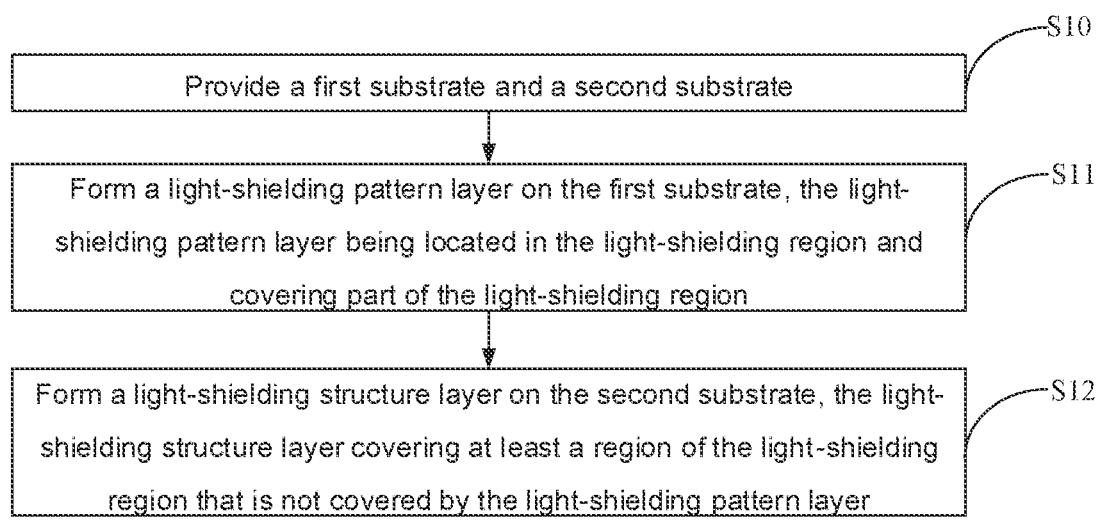
FIG. 18 is a flowchart of a method for manufacturing a display panel, in accordance with some embodiments of the present disclosure.

Some embodiments of the present disclosure provide a method for manufacturing a display panel 100. As shown in FIGS. 4, 5, 7, 10, 14, and 15, the display panel 100 has a plurality of sub-pixel regions P arranged in an array of a plurality of rows and a plurality of columns, and a light-shielding region Q that separates the sub-pixel regions P and surrounds all the sub-pixel regions P as a whole. As shown in FIG. 18, the manufacturing method includes the following steps (S10 to S12).

In S10, referring to FIGS. 3B, 4 and 5, a first substrate 301 and a second substrate 302 are provided. Sub-pixel regions P on the first substrate 301 and the second substrate 302 are in one-to-one correspondence, and light-shielding regions Q on the first substrate 301 and the second substrate 302 are in one-to-one correspondence.

In S11, referring to FIG. 4, a light-shielding pattern layer 40 is formed on the first substrate 301. For example, referring to FIG. 4, the light-shielding pattern layer 40 is located in the light-shielding region Q and covers part of the light-shielding region Q. The light-shielding pattern layer 40 may effectively prevent light emitted by the sub-pixel region P from leaking out from the part of light-shielding region Q and affecting a display effect of the display panel 100.

In S12, referring to FIG. 5, a light-shielding structure layer 50 is formed on the second substrate 302. For example, referring to FIGS. 4 and 5, the light-shielding structure layer 50 covers at least a region of the light-shielding region Q that is not covered by the light-shielding pattern layer 40. The light-shielding structure layer 50 may provide a good light-shielding effect on the region of the light-shielding region Q covered by the light-shielding structure layer 50, and may effectively avoid light leakage from the region of the light-shielding region Q covered by the light-shielding structure layer 50 and affecting the display effect of the display panel 100.

The method for manufacturing the display panel 100 provided in the embodiments of the present disclosure may be used to manufacture the display panel 100 as described in any of the above embodiments. In the display panel 100, since the light-shielding pattern layer 40 and the light-shielding structure layer 50 are arranged in different layers, it may be possible to reduce the amount of induced charges accumulated on the light-shielding pattern layer 40 (or the light-shielding structure layer 50) when the voltages on the signal lines in the display panel 100 jump, thereby effectively ameliorating the phenomenon of light leakage of the display panel caused by the rotation of liquid crystal molecules due to the voltage jumps on the signal lines.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A display panel having a plurality of sub-pixel regions arranged in an array of a plurality of rows and a plurality of columns, and a light-shielding region that separates the plurality of sub-pixel regions and surrounds all the sub-pixel regions as a whole, the display panel comprising:
    a first substrate;
    a light-shielding pattern layer located on the first substrate, the light-shielding pattern layer being located in the light-shielding region and covering part of the light-shielding region;
    a second substrate disposed opposite to the first substrate; and
    a light-shielding structure layer located on the second substrate, the light-shielding structure layer covering at least a region of the light-shielding region that is not covered by the light-shielding pattern layer;
    wherein the light-shielding region includes a first light-shielding region separating the plurality of sub-pixel regions and a second light-shielding region surrounding all the sub-pixel regions;
    the first light-shielding region and the plurality of sub-pixel regions constitute a display region, and the second light-shielding region includes a first light-shielding sub-region located on a bonding side of the display panel;
    the display panel further comprises:
        a first conductive layer, at least one insulating layer and a second conductive layer that are disposed on a side of the second substrate proximate to the first substrate in sequence, wherein the first conductive layer includes a common voltage line located in the first light-shielding sub-region; and
        the second conductive layer includes a plurality of common electrodes located in the plurality of sub-pixel regions and a conductive connection portion located in the first light-shielding sub-region and connecting to the plurality of common electrodes;
        the conductive connection portion is connected to the common voltage line through at least two via holes in the at least one insulating layer, wherein a portion of the conductive connection portion located between two adjacent via holes has a hollowed-out portion.

2. The display panel according to claim 1, wherein the light-shielding pattern layer includes:
    a first light-shielding portion located in the first light-shielding sub-region, wherein a first gap exists between the first light-shielding portion and the display region.

3. The display panel according to claim 2, wherein in a direction perpendicular to an extension direction of a side of the display region proximate to the first light-shielding portion, a dimension of the first gap is greater than or equal to 5 μm.

4. The display panel according to claim 2, wherein the light-shielding structure layer includes:
    a first light-shielding structure, wherein an orthographic projection of the first light-shielding structure on the first substrate covers the first gap.

5. The display panel according to claim 4, wherein the first light-shielding structure includes at least two filter units of different colors that are stacked.

6. The display panel according to claim 5, wherein the at least two filter units of different colors that are stacked include:
    a blue filter unit and a red filter unit that are stacked.

7. The display panel according to claim 1, wherein the hollowed-out portion is a recess-shaped opening, and an opening end of the recess-shaped opening faces away from the display region, wherein the recess-shaped opening is set according to at least one of following manners:
    a width of the recess-shaped opening is approximately 32 μm; or a depth of the recess-shaped opening is approximately 13 µm; or a distance between a bottom surface of the recess-shaped opening and the display region is approximately 8 µm.

8. The display panel according to claim 1, wherein the second light-shielding region further includes a second light-shielding sub-region other than the first light-shielding sub-region;

the light-shielding pattern layer includes:
a second light-shielding portion located in the second light-shielding sub-region, the second light-shielding portion extending from a boundary of the display region to a side away from the display region; and
a third light-shielding portion located in the second light-shielding sub-region and located on a side of the second light-shielding portion away from the display region, the third light-shielding portion including a plurality of light-shielding sub-blocks arranged at intervals, and at least part of the light-shielding sub-blocks being of different shapes.

9. The display panel according to claim 8, wherein the light-shielding structure layer includes:
a second light-shielding structure, an orthographic projection of the second light-shielding structure on the first substrate covering at least a region located on a side of the second light-shielding portion away from the display region.

10. The display panel according to claim 9, wherein the second light-shielding structure is located on a side of the second substrate away from the first substrate, and the second light-shielding structure includes black ink; or
the second light-shielding structure is located on a side of the second substrate proximate to the first substrate, and the second light-shielding structure includes at least two filter units of different colors that are stacked; or
the second light-shielding structure is located on the side of the second substrate proximate to the first substrate, the second light-shielding structure includes the at least two filter units of different colors that are stacked, and the at least two filter units of different colors that are stacked include a blue filter unit and a red filter unit that are stacked.

11. The display panel according to claim 10, further comprising:
a frame sealant located between the second substrate and the first substrate, wherein in a case where the second light-shielding structure is located on the side of the second substrate proximate to the first substrate, the frame sealant is located in the second light-shielding sub-region, and an orthographic projection of the frame sealant on the first substrate dose not overlap with the orthographic projection of the second light-shielding structure on the first substrate.

12. The display panel according to claim 1, wherein the light-shielding pattern layer includes:
a plurality of fourth light-shielding portions located in the first light-shielding region, wherein a second gap exists between two adjacent fourth light-shielding portions.

13. The display panel according to claim 12, wherein at least one fourth light-shielding portion in the plurality of fourth light-shielding portions is disposed between two adjacent rows of sub-pixel regions;
a fourth light-shielding portion in the at least one fourth light-shielding portion extends in a row direction of the plurality of sub-pixel regions and extends across at least one sub-pixel region in the two adjacent rows of sub-pixel regions in the row direction.

14. The display panel according to claim 13, wherein the at least one fourth light-shielding portion includes fourth light-shielding portions, a number of the fourth light-shielding portions between the two adjacent rows of sub-pixel regions is equal to a number of sub-pixel regions in a row of sub-pixel regions in the two adjacent rows of sub-pixel regions;
each of the fourth light-shielding portions corresponds to a sub-pixel region in the row of sub-pixel regions, and each fourth light-shielding portion extends from a side to another side of the corresponding sub-pixel region.

15. The display panel according to claim 14, wherein the light-shielding structure layer includes:
a plurality of third light-shielding structures, wherein each third light-shielding structure separates two adjacent columns of sub-pixel regions in the plurality of sub-pixel regions.

16. The display panel according to claim 15, further comprising:
a color filter layer located on the second substrate, wherein the color filter layer includes a plurality of filter units;
each filter unit covers a column of sub-pixel regions;
two adjacent filter units allow light of different colors to pass through, the two adjacent filter units partially overlap, and an overlapping portion of the two adjacent filter units is used as a third light-shielding structure in the plurality of third light-shielding structures.

17. The display panel according to claim 15, wherein the third light-shielding structure includes at least two filter units of different colors that are stacked; or
the third light-shielding structure includes the at least two filter units of different colors that are stacked, and the at least two filter units of different colors that are stacked include a blue filter unit and a red filter unit that are stacked.

18. A display device, comprising:
the display panel according to claim 1.

19. A method for manufacturing a display panel, wherein the display panel has a plurality of sub-pixel regions arranged in an array of a plurality of rows and a plurality of columns, and a light-shielding region that separates the plurality of sub-pixel regions and surrounds all the sub-pixel regions as a whole;
the light-shielding region includes a first light-shielding region separating the plurality of sub-pixel regions and a second light-shielding region surrounding all the sub-pixel regions;
the first light-shielding region and the plurality of sub-pixel regions constitute a display region, and the second light-shielding region includes a first light-shielding sub-region located on a bonding side of the display panel;
the manufacturing method comprises:
providing a first substrate and a second substrate;
forming a light-shielding pattern layer on the first substrate, the light-shielding pattern layer being located in the light-shielding region and covering part of the light-shielding region; and
forming a light-shielding structure layer on the second substrate, the light-shielding structure layer covering at least a region of the light-shielding region that is not covered by the light-shielding pattern layer;
the manufacturing method further comprises:

forming a first conductive layer, at least one insulating layer and a second conductive layer on a side of the second substrate proximate to the first substrate in sequence, wherein the first conductive layer includes a common voltage line located in the first light-shielding sub-region; and the second conductive layer includes a plurality of common electrodes located in the plurality of sub-pixel regions and a conductive connection portion located in the first light-shielding sub-region and connecting to the plurality of common electrodes;

the conductive connection portion is connected to the common voltage line through at least two via holes in the at least one insulating layer, wherein a portion of the conductive connection portion located between two adjacent via holes has a hollowed-out portion.

\* \* \* \* \*